United States Patent
Chen et al.

(10) Patent No.: US 7,643,170 B2
(45) Date of Patent: Jan. 5, 2010

(54) INTELLIGENT PRINT SYSTEM AND METHOD THAT DETERMINES QUEUE PRIORITY BASED ON AN INTERRUPT FEATURE AND CHARACTERISTICS OF THE SENDER AND PRINT DATA

(75) Inventors: Chien Lung Chen, Taipei (TW); Ching Yung Chen, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 830 days.

(21) Appl. No.: 11/201,240

(22) Filed: Aug. 11, 2005

(65) Prior Publication Data

US 2006/0146354 A1 Jul. 6, 2006

(30) Foreign Application Priority Data

Dec. 31, 2004 (CN) .................... 2004 1 0081800

(51) Int. Cl.
*G06K 15/00* (2006.01)
(52) U.S. Cl. .............. 358/1.16; 358/1.1; 358/1.14; 399/81; 399/87
(58) Field of Classification Search ............... 358/1.1, 358/1.13–1.18; 399/81, 82, 85, 87; 709/223–226
See application file for complete search history.

(56) References Cited

U.S. PATENT DOCUMENTS

| | | | | |
|---|---|---|---|---|
| 5,528,375 A * | 6/1996 | Wegeng et al. | ............... | 358/296 |
| 6,038,033 A * | 3/2000 | Bender et al. | ............... | 358/1.16 |
| 6,483,999 B1 * | 11/2002 | Andersen et al. | ............... | 399/87 |
| 6,504,621 B1 * | 1/2003 | Salgado | ............... | 358/1.16 |
| 6,570,605 B1 * | 5/2003 | Kashiwazaki | ............... | 347/264 |
| 6,698,950 B2 * | 3/2004 | Nishii | ............... | 400/63 |
| 2001/0038461 A1 * | 11/2001 | Murakami et al. | ......... | 358/1.13 |
| 2001/0053301 A1 * | 12/2001 | Nishii | ............... | 400/63 |
| 2002/0118387 A1 * | 8/2002 | Patton | ............... | 358/1.15 |
| 2002/0135796 A1 * | 9/2002 | Alexander | ............... | 358/1.15 |
| 2005/0024672 A1 * | 2/2005 | Guster et al. | ............... | 358/1.14 |
| 2005/0052679 A1 * | 3/2005 | Green et al. | ............... | 358/1.14 |
| 2005/0141030 A1 * | 6/2005 | Tuchitoi et al. | ............ | 358/1.16 |
| 2005/0200885 A1 * | 9/2005 | Nishizawa et al. | ......... | 358/1.15 |
| 2007/0268508 A1 * | 11/2007 | Kitamura | ............... | 358/1.14 |

\* cited by examiner

*Primary Examiner*—Kimberly A Williams
(74) *Attorney, Agent, or Firm*—Bacon & Thomas, PLLC (57) ABSTRACT

An intelligent print system includes at least one document generating side, a priority generating unit and a machine side. The document generating side has been installed therein a printer driver for outputting a ready-for-print document. The priority generating unit is used for selectively providing a priority value to the document. The machine side includes a receiving and processing unit for receiving the document from the document generating side, a manual operation unit having an interrupt button and for a user to select documents having higher priority, a job selecting unit for discriminating the priority order of the document, and a print control unit for printing the document.

13 Claims, 9 Drawing Sheets

INTELLIGENT PRINT SYSTEM AND METHOD THAT DETERMINES QUEUE PRIORITY BASED ON AN INTERRUPT FEATURE AND CHARACTERISTICS OF THE SENDER AND PRINT DATA

FIELD OF THE INVENTION

The present invention relates to an intelligent print system and method, and more particularly to an intelligent print system and method for avoiding the resource contention problem by intelligently processing and selecting the document to be printed according to the priority order.

BACKGROUND OF THE INVENTION

A Local area network (LAN) is widely used to interconnect many workstations such as computers and printers so as to achieve resource sharing among them. Via the LAN, only one printer linked to the LAN could execute various print jobs from different workstations. In order to execute print jobs from a plurality of workstations in a predetermined order, the processor builds a print queue table containing all queue identifiers necessary to identify the print jobs to be executed, and the specific print jobs are performed in accordance with the print queue table. For example, two workstations A and B intend to print 100 and 5 pages of documents, respectively. If the print job from the workstation A is being executed, for a purpose of instantly printing the 5 pages of document transmitted from the workstation B, the print job from the workstation A should be deleted. Instead, the print job from the workstation B is successively executed after the print job from the workstation A is fulfilled.

Consequently, because of the technical defects of described above, the applicant keeps on carving unflaggingly through wholehearted experience and research to develop the present invention, which can effectively improve the resource contention problems described above.

SUMMARY OF THE INVENTION

An object of the present invention is to provide an intelligent print system to avoid the resource contention problems such that the documents are intelligently processed and selected according to the priory orders and the object is implemented by software without the requirement of changing the hardware.

Another object of the present invention is to provide an intelligent print method for intelligently processing and selecting many read-for-print documents.

In accordance with a first aspect of the present invention, there is provided an intelligent print system. The intelligent print system comprises at least one document generating side, a priority generating unit and a machine side. The document generating side has been installed therein a printer driver for outputting a ready-for-print document. The priority generating unit is used for selectively providing a priority value to the document. The machine side comprises a receiving and processing unit for receiving the document from the document generating side, a manual operation unit having an interrupt button and for a user to select documents having higher priority, a job selecting unit for discriminating the priority order of the document, and a print control unit for printing the document.

In an embodiment, the priority generating unit is included in a printer driver of the document generating side.

In an embodiment, the priority generating unit is included in the machine side.

In an embodiment, the job selecting unit further selects the document having the highest priority to be printed if an interruption signal is asserted from the manual operation unit, and retrieves the document identification code and the page number of the document to be printed.

In an embodiment, the receiving and processing unit further retrieves a document identification code from a working status table, and store the document in a document file of a single page format into a memory device according to the document identification code and the page number of the document.

In an embodiment, the print control unit further retrieves a corresponding document file from the memory device according to the document identification code and the page number of the document.

In an embodiment, the job selecting unit retrieves the document identification code of the ready-for-print document according to the value listed in the column priority of the working status table.

In an embodiment, the manual operation unit is enabled when a valid password is entered, thereby limiting authority of the interruption function.

In accordance with a second aspect of the present invention, there is provided an intelligent print system. The intelligent print method comprises the following steps. Firstly, a priority generating function is provided in a document generating side. Then, a document is received from the document generating side. Then, a document identification code is retrieved from a working status table. The document in a document file of a single page format according to the document identification code and the page number of the document is opened, and the document file is stored into a memory device. Then, the document identification code of the ready-for-print document is retrieved according to the value listed in the priority column of the working status table. The document file is opened according to the document identification code and the page number of the document to be printed. Afterward, the document file is transmitted to an output buffer so as to be further printed.

In an embodiment, a priority value is provided to the document according to the condition whether the data have been compressed, the page number of the read-for-print document, the user's name and the file name of the document.

In an embodiment, the priority generating function is automatically generated from the document generating side.

In an embodiment, the priority generating function is manually generated from the document generating side.

In an embodiment, the method further comprises a step of reading the document identification code from a user operation interface when a user's job intervenes.

In an embodiment, the user's job intervenes when a document identification code is inputted.

In an embodiment, the method further comprises a step of showing the current working statuses when an interrupt button of the machine side is depressed.

In accordance with a third aspect of the present invention, there is provided an intelligent print system. The intelligent print method comprises the following steps. Firstly, a machine priority table is provided in a machine side. Then, a document is received from a document generating side. Then, a document identification code is retrieved from a working status table. The document in a document file of a single page format according to the document identification code and the page number of the document is opened, and the document file is stored into a memory device. Then, the document identification code of the ready-for-print document is retrieved according to the value listed in the priority column of the working status table. The document file is opened according to the document identification code and the page number of the document to be printed. Afterward, the document file is transmitted to an output buffer so as to be further printed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
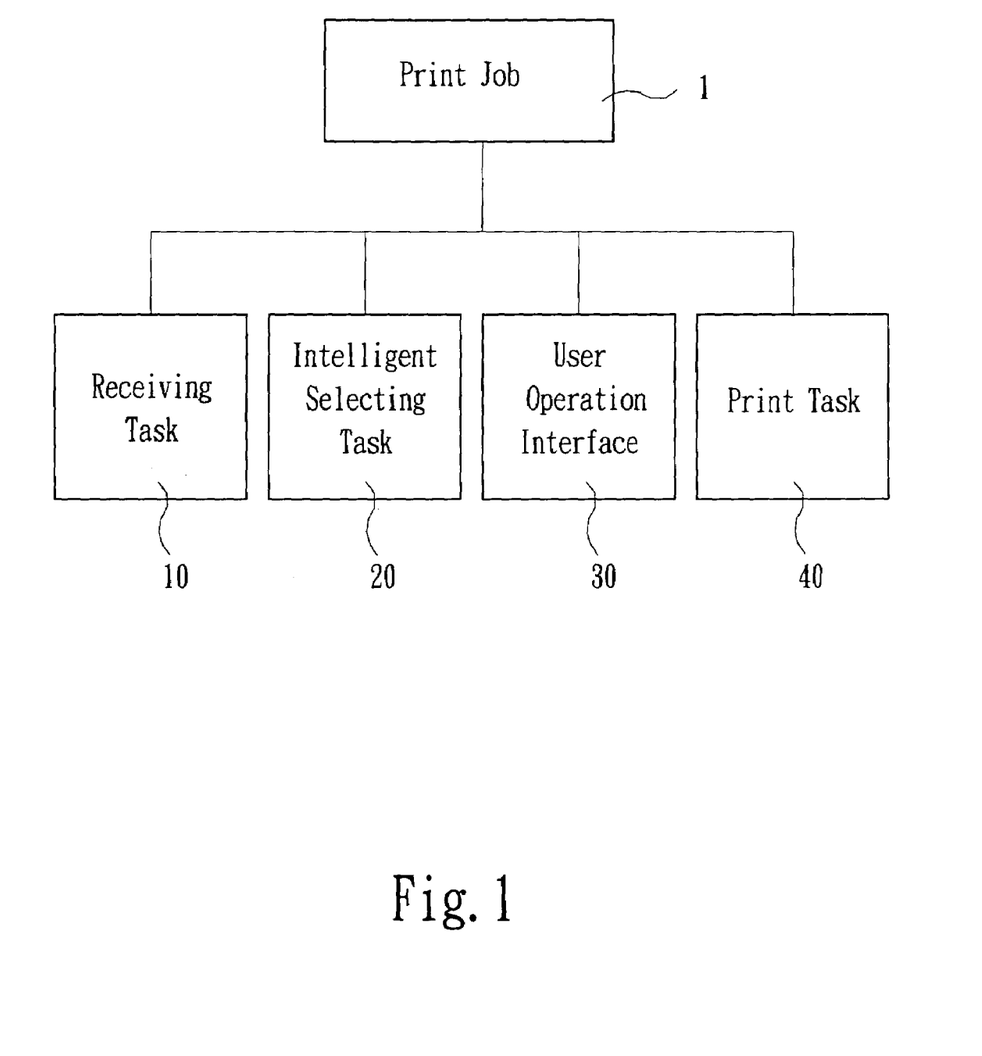
FIG. 1 schematically illustrates a configuration of a print job of an intelligent print system according to a preferred embodiment of the present invention.

Referring to FIG. 1, the configuration of a print job is shown. The print job 1 comprises a receiving task 10 for receiving the documents to be printed, an intelligent selecting task 20 for selecting the document according to the priority order, a user operation interface 30 for interruption and/or manually selecting the document having a higher priority to be printed and a print task 40 for printing the documents. The operation principle of the respective task will be described in more details with reference to the following examples.

Figure 2:
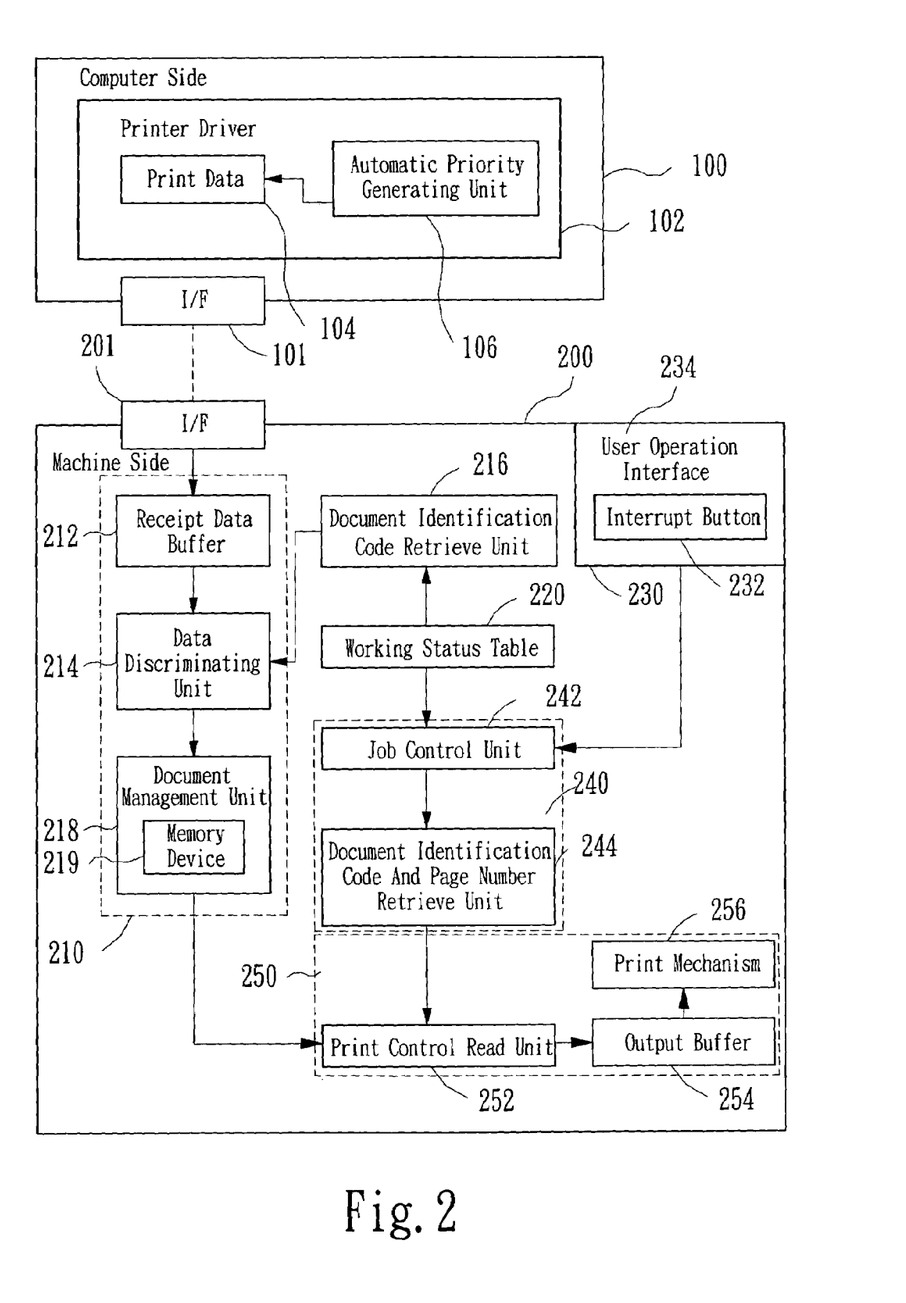
FIG. 2 is a functional block diagrams illustrating the intelligent print system according to a first preferred embodiment of the present invention.

Referring to FIG. 2, an intelligent print system of processing and selecting documents according to a preferred embodiment of the present invention is illustrated. The print system comprises a document generating side (for example a computer side 100) and a machine side 200 such as a printer or a multifunction printer. The computer side 100 is communicated with the machine side 200 via interfaces (I/F) 101 and 201. The interfaces (I/F) 101 and 201 are communicated in a wired or wireless manner. Alternatively, the computer side 100 may be communicated with the machine side 200 via a network system. Depending on the manufacturer's design, the document generating side may be a portable storage device such as a memory card, a personal digital assistant (PDA) and the like.

In this embodiment, the computer side 100 has been installed therein a printer driver 102 for outputting a ready-for-print document 104. For a purpose of discriminating the priority order of the document to be printed, the priority is represented by a value to be compared with others. The priory order is automatically or manually generated from the computer side 100. Alternatively, the priory order is automatically generated from the machine side 200.

In the embodiment of FIG. 2, the priority generating unit is an automatic priority generating unit 106, which is disposed in the printer driver 102 of the computer side 100. During the ready-for-print document 104 is generated, a priority value is automatically attached to the ready-for-print document 104 according to a preset comparing result. The priority value generated from the priority generating unit 106 is successively determined according to one or more conditions involving whether the data have been compressed, the page number of the read-for-print document, the user's name and the file name of the document. The contents may be represented by various values according to the different conditions. For example, the document having been compressed, having a smaller file size or having less page number possesses a higher priority value. Optionally, in views of the user's name, the document from the user having a higher job position has a higher priority value.

The machine side 200 principally comprises a receiving and processing unit 210, a working status table 220, a manual operation unit 230, a job selecting unit 240 and a print control unit 250.

The receiving and processing unit 210 comprises a receipt data buffer 212, a data discriminating unit 214 and a document management unit 218. The receipt data buffer 212 is electrically connected to the interface 210 of the machine side 200 for receiving the documents from the computer side 100. Then, by means of the data discriminating unit 214, a document identification code is attached to the document received by the receipt data buffer 212. The document identification code is obtained from the working status table 220 via a document identification code retrieve unit 216, thereby enhancing the successive processing procedures. Then, according to the document identification code and the page number of the document, the document management unit 218 will store a document file in a single page format into a memory device 219 within the document management unit 218. The document file comprises the document identification code, the page number and the print data such as page width, page length, page specification, page type and resolution. The present invention is distinguished by using the document file in a single page format. In a case that the printing document is interrupted, such a document file allows for printing the document having higher priority without deleting the whole printing document.

The working status table 220 is used for recording the statuses of the ready-for-print document. The working status table 220 comprises several columns such as the document identification code (Job_ID, for example 1~N), whether the identification code has been used (Using, for example default=0), the number of received pages (RxPage, for example default=0), total pages (Total Page, for example default=x0fff), whether it is being printed currently (printing, for example default=0), the number of pages having been printed (printing page, for example default=0), the user's name (UserName, for example default=0), the password (Password, for example default=0), the priority (prior, for example default=none) and the name of the document, which is advantageous for manually selecting which document has the priority to be printed.

The manual operation unit 230 comprises an interrupt button 232 and a user operation interface 234 for selecting which document has the priority to be printed according to a manual operation. In addition, for a purpose of preventing many users from misusing the interruption function, the manual operation unit 230 is enabled when a valid password is entered, thereby limiting authority of the interruption function.

The job selecting unit 240 retrieves the document identification code of the ready-for-print document and the page number thereof according to the value of the column "priority" in the working status table 220. The job selecting unit 240 comprises a job control unit 242, a document identification code and page number retrieving unit 244. The job control unit 242 discriminates the priory order of the document according to the value of the column "priority" in the working status table 220, or selects the document having the highest priority to be printed if an interruption signal is asserted from the manual operation unit 230. Subsequently, the document identification code and page number retrieving unit 244 will retrieve the document identification code and page number of the document to be printed.

The print control unit 250 comprises a print control read unit 252, an output buffer 254 and a print mechanism 256. The print control read unit 252 is electrically connected to the document identification code and page number retrieving unit 244 and the memory device 219 within the document management unit 218. The document file corresponding to the document identification code and page number from the document identification code and page number retrieving unit 244 or the document identification code and page number from the memory device 219 is processed by the print control read unit 252, outputted to the output buffer 254, and printed by the print mechanism 256.

Figure 3:
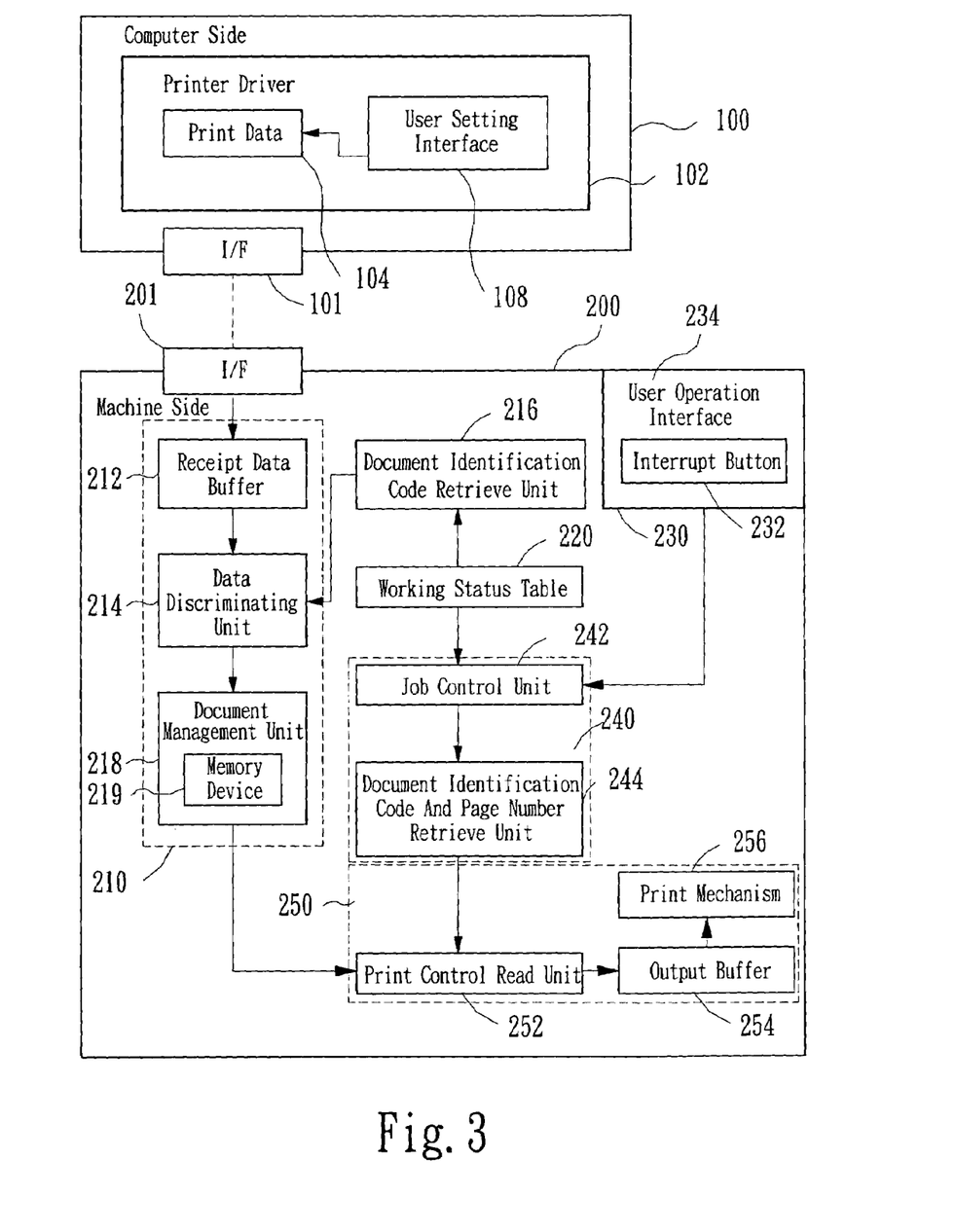
FIG. 3 is a functional block diagrams illustrating the intelligent print system according to a second preferred embodiment of the present invention.

A further embodiment of an intelligent print system of processing and selecting documents is illustrated in FIG. 3. In this embodiment, the functional blocks of the machine side 200 included therein are similar to those shown in FIG. 2, and are not to be redundantly described herein. In addition, the priority generating unit in the computer side 100 is a user setting interface 108 for a user (for example an administrator) to set the priority order of the documents to be printed therevia. In addition, the user setting interface 108 is enabled when a password is entered, thereby limiting authority of the interruption function.

Figure 4:
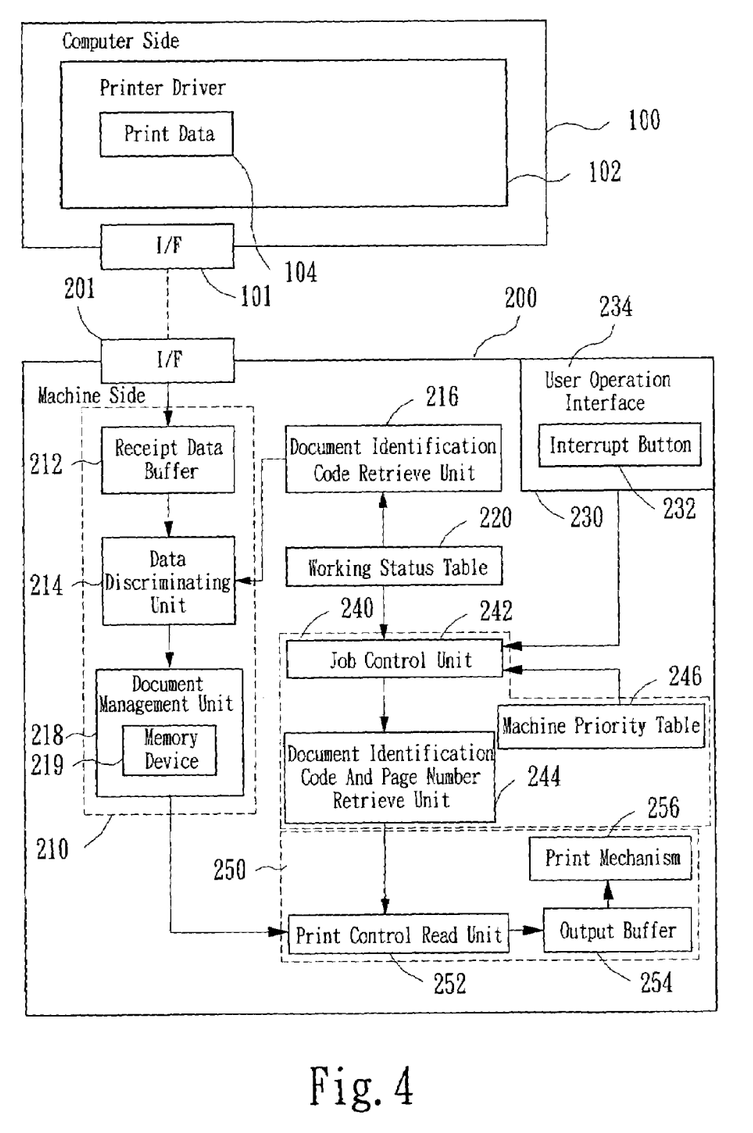
FIG. 4 is a functional block diagrams illustrating the intelligent print system according to a third preferred embodiment of the present invention.

A further embodiment of an intelligent print system of processing and selecting documents is illustrated in FIG. 4. In this embodiment, the priority generating unit is a machine priority table 246 disposed in the machine side 200 and electrically connected to the job control unit 242 of the job selecting unit 240. The job control unit 242 discriminates the priory order of the document according to the value of the column "priority" in the working status table 220 and the machine priority table 246. If an interruption signal is asserted from the manual operation unit 230, the document having the highest priority to be printed is selected. Subsequently, the document identification code and page number retrieving unit 244 will retrieve the document identification code and page number of the document to be printed. The contents of the machine priority table 246 may include the condition whether the data have been compressed, the page number of the read-for-print document, the user's name and the file name of the document. The contents may be represented by various values according to the different conditions. These values are automatically summed up in order to give an index for discriminating the document.

Hereinafter, some embodiments of the print method for intelligently processing and selecting documents according to the present invention will be illustrated with reference to FIGS. 5-9.

Figure 5:
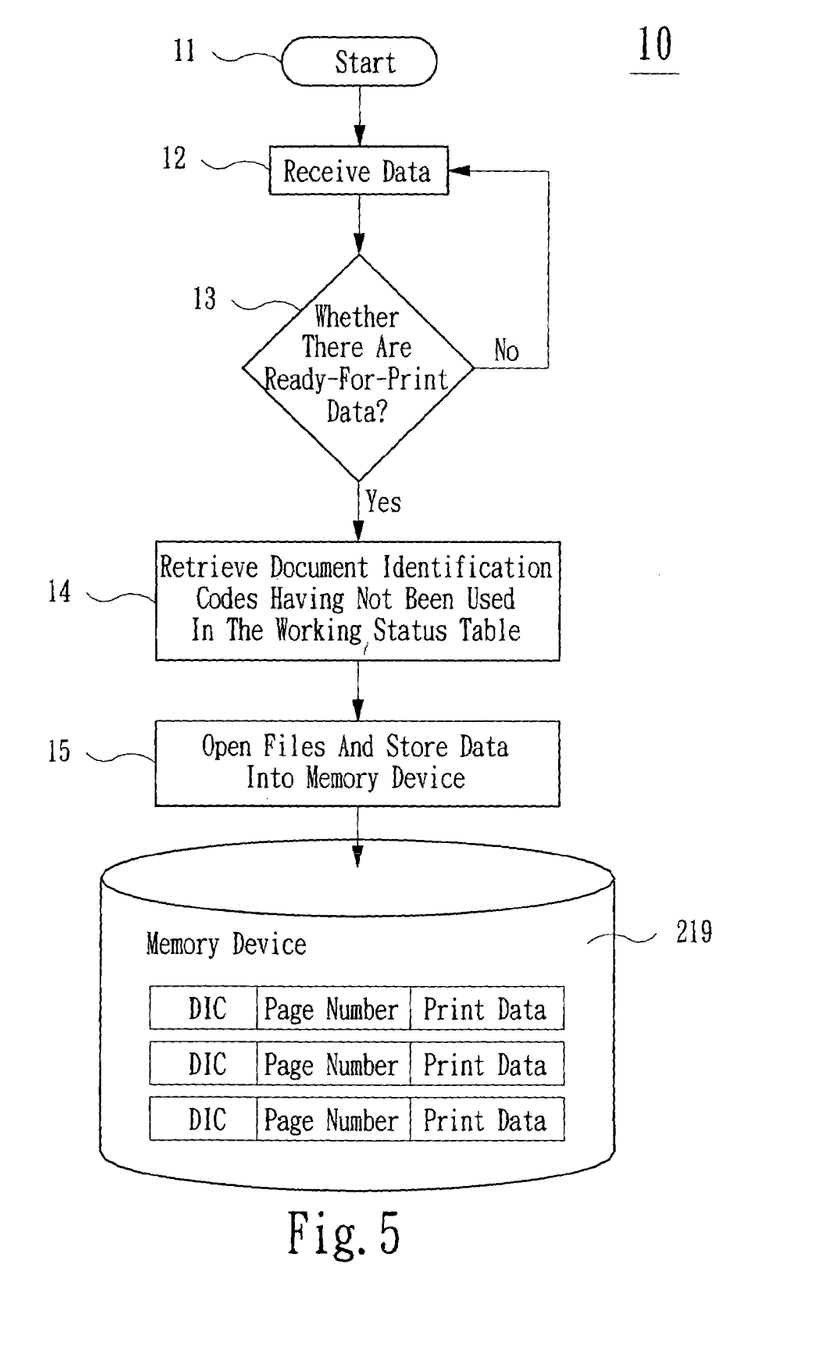
FIG. 5 is a flowchart illustrating a receiving task of the intelligent print method of the present invention.

In FIG. 5, the receiving task 10 of the print method of the present invention is illustrated. In response to the triggering operation of the computer side 100, the receiving task 10 starts (Step 11) to receive data from the computer side 100 (Step 12). Since the data have various types such as commands or ready-for-print data, a discriminating step (Step 13) is necessary to discriminate whether there are ready-for-print data. If the ready-for-print data are received, the document identification codes having not been used in the working status table 220 are retrieved (Step 14). Otherwise, the receiving task 10 continuously receives data from the computer side 100 (Step 12). After Step 14, the ready-for-print data are allowed to open files according to the document identification codes (DICs) and the number of pages and stored in the memory device 219 (Step 15).

Figure 6:
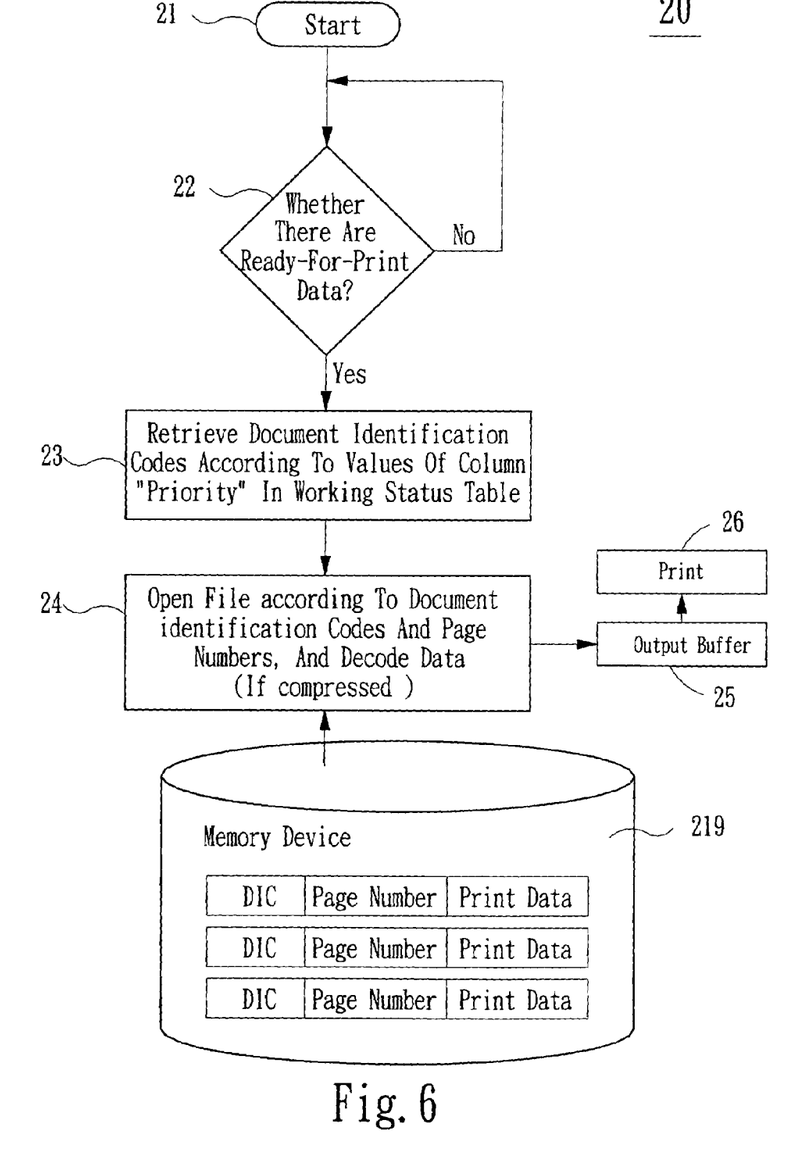
FIG. 6 is a flowchart illustrating an intelligent selecting task of the intelligent print method of the present invention wherein the priority is generated from the computer side.

In FIG. 6, an intelligent selecting task 20 of the print method of the present invention is illustrated. After the receiving task 10, the intelligent selecting task 20 starts (Step 21). Then, a discriminating step (Step 22) is used to discriminate whether there are ready-for-print data in the working status table 220. If there are ready-for-print data in the working status table 220, the document identification codes of the documents to be printed are retrieved according to the values of the column "priority" in the working status table 220 (Step 23). Otherwise, the intelligent selecting task 20 continuously discriminate whether there are ready-for-print data in the working status table 220 (Step 22). After Step 23, the files stored in the memory device 219 are opened according to the document identification codes (DICs) and the page numbers of the documents to be printed and the data are decoded (if the data are compressed) (Step 24). The files are transmitted to the output buffer 254 (Step 25). Afterward, practical print jobs are executed by the print mechanism 256 (Step 26).

Figure 7:
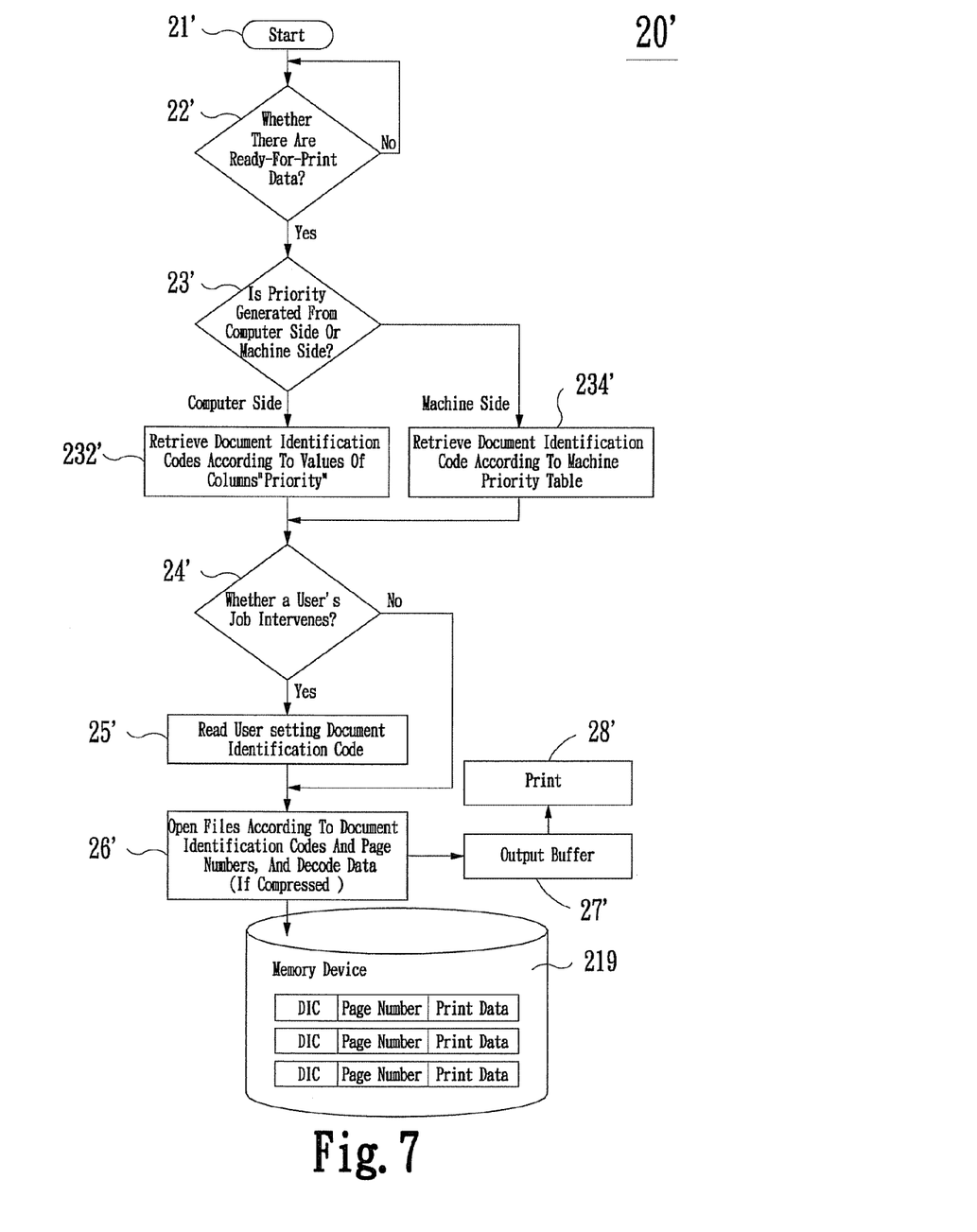
FIG. 7 is a flowchart illustrating another intelligent selecting task of the intelligent print method of the present invention wherein the priority is generated from the computer side or the machine side.

The above embodiments are illustrated by referring to the print methods in which the functions of setting priority order are implemented in the computer side 100. Nevertheless, the functions of setting priority order can be implemented in the machine side 200 for example via the machine priority table 246, as shown in FIG. 4. Meanwhile, an alternative intelligent selecting task 20 is performed. In FIG. 7, an intelligent selecting task 20' of the print method of the present invention is illustrated. After the receiving task 10 as shown in FIG. 5, the intelligent selecting task 20' starts (Step 21'). Then, a discriminating step (Step 22') is used to discriminate whether there are ready-for-print data in the working status table 220. If there are ready-for-print data in the working status table 220, it is further discriminated whether the priority is generated from the computer side 100 or the machine side 200 (Step 23'). Otherwise, the intelligent selecting task 20 continuously discriminate whether there are ready-for-print data in the working status table 220 (Step 22'). In a case that the priority is generated from the computer side 100, the document identification codes of the documents to be printed are retrieved according to the values of the column "priority" in the working status table 220 (Step 232'). On the contrary, in a case that the priority is generated from the machine side 200, the document identification codes of the documents to be printed are retrieved according to the machine priority table 246 in the machine side 200 (Step 234').

Then, it is further discriminated whether a user's job from the manual operation unit 230 of the machine side 200 intervenes the print jobs (Step 24'). If the user's job intervenes the print jobs, a user-setting document identification code is read (Step 25') and then the files stored in the memory device 219 are opened according to the document identification codes and the page numbers of the documents to be printed and decoded (if the data are compressed) (Step 26'). Otherwise, if no user's job intervenes the print jobs, the step 26' is directly performed. After Step 26', the files are transmitted to the output buffer 254 (Step 27'), and the practical print jobs are executed by the print mechanism 256 (Step 28').

Figure 8:
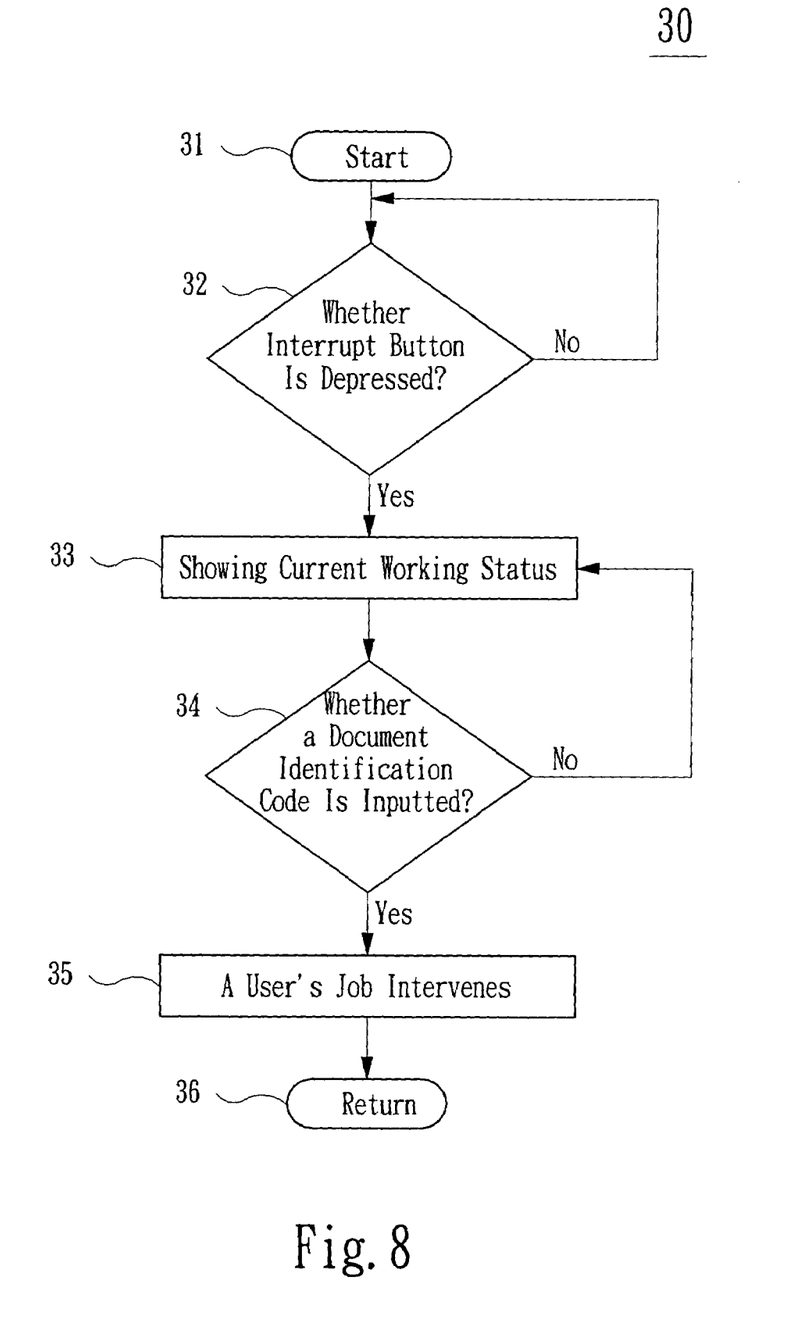
FIG. 8 is a flowchart illustrating the intelligent print method of the present invention wherein the user operation interface is enabled without requirement of entering a password.

The detailed procedure involving the step of discriminating whether a user's job from the manual operation unit 230 of the machine side 200 intervenes the print jobs (Step 24') is illustrated in the user operation interface 30 of FIG. 8. In FIG. 8, the user operation interface 30 is enabled without requirement of entering a password. The user operation interface 30 is enabled to start when the machine side 200 is powered on (Step 31). Then, it is discriminated whether an interrupt button 232 of the machine side 200 is depressed (Step 32). If the interrupt button 232 is depressed, the current working statuses associated with for example the user's names and the name of the documents are shown to have the user select which document has the highest priority to be printed (Step 33). Otherwise, the step of discriminating whether an interrupt button 232 is depressed is continued (Step 32). After Step 33, it is discriminated whether the user inputs any document identification code (Step 34). If a document identification code is inputted, it is meant that a user's job intervenes the print jobs (Step 35). Otherwise, Step 33 is continuously performed. After Step 35, the process returns to the document identification code and page number retrieving unit 244 to retrieve the document identification code and page number of the document to be printed and continuously executes the operation of print control unit 250 (Step 36).

Figure 9:
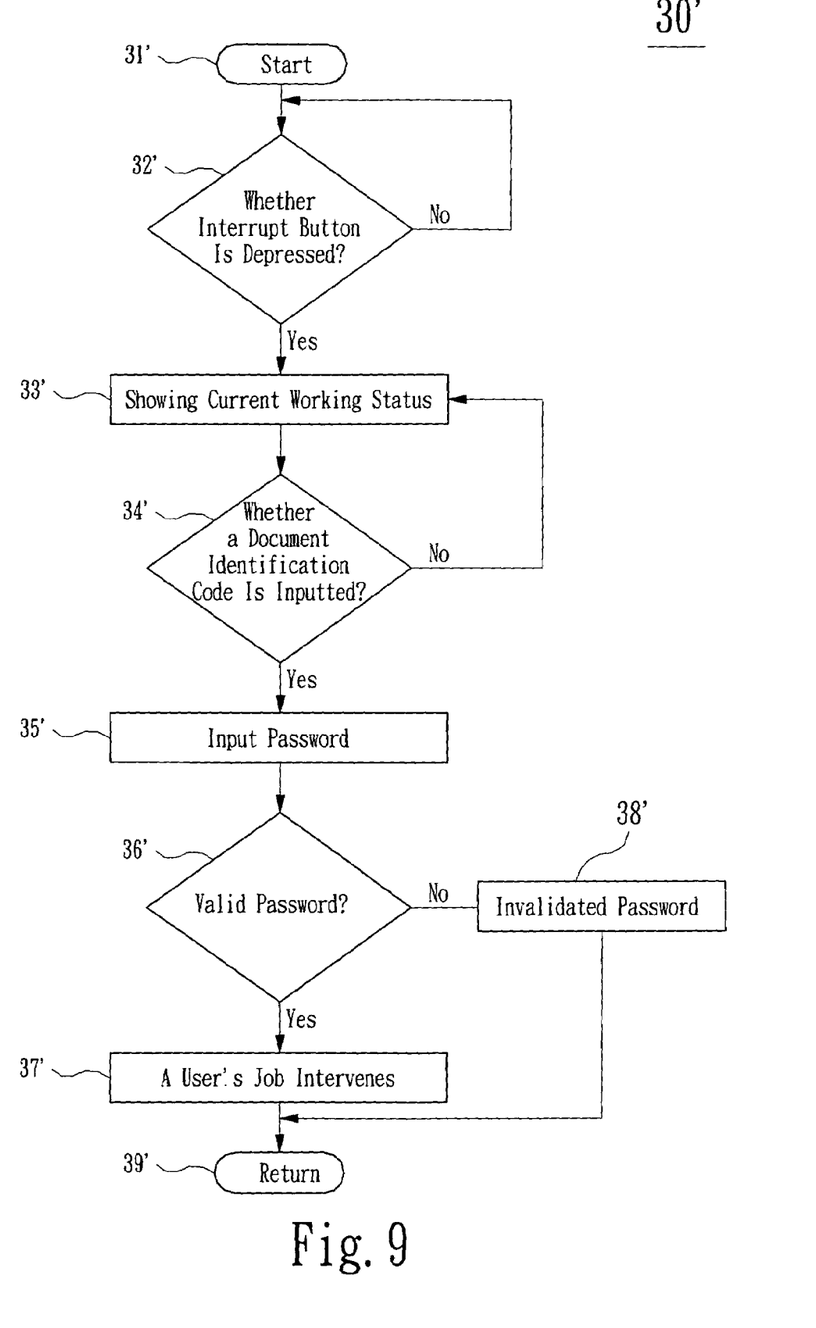
FIG. 9 is a flowchart illustrating the intelligent print method of the present invention wherein the user operation interface is enabled with the requirement of entering a password.

In FIG. 9, the user operation interface 30' is enabled with the requirement of entering a password. The user operation interface 30' is enabled to start when the machine side 200 is powered on (Step 31'). Then, it is discriminated whether an interrupt button 232 of the machine side 200 is depressed (Step 32'). If the interrupt button 232 is depressed, the current working statuses associated with for example the user's names and the name of the documents are shown to have the user select which document has the highest priority to be printed (Step 33'). Otherwise, the step of discriminating whether an interrupt button 232 is depressed is continued (Step 32'). After Step 33', it is discriminated whether the user inputs any document identification code (Step 34'). If a document identification code is inputted, the user may input a password (Step 35'). Otherwise, Step 33' is continuously performed. After Step 35', if the password is checked to be valid (Step 36'), it is meant that a user's job intervenes the print jobs (Step 37'). Otherwise, the password is invalidated (Step 38'). After Step 37' and 38', the process returns to the document identification code and page number retrieving unit 244 to retrieve the document identification code and page number of the document to be printed and continuously executes the operation of print control unit 250 (Step 39').

The print system and method of present invention, when comparing with other previous conventional technologies, has following advantages:

1. The resource contention problems may be solved because the documents are intelligently processed and selected according to the priory orders. This object is implemented by software without the requirement of changing the hardware.

2. Many read-for-print documents are intelligently processed and selected according to the priory orders so as to avoid the problems of either deleting or waiting the document being printed or waiting.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An intelligent print system comprising:
    at least one document generating side having installed therein a printer driver for outputting a ready-for-print document;
    a priority generating unit for selectively providing a priority value to said document; and
    a machine side comprising a receiving and processing unit for receiving said document from said document generating side, a manual operation unit having an interrupt button and a user operation interface for a user to intervene a current print job and input a document identification code for selecting a document with higher priority to be printed, a job selecting unit for discriminating the priority order of said document, and a print control unit for printing said document;
    wherein said receiving and processing unit further retrieves a document identification code from a working status table, and store said document in a document file of a single page format into a memory device according to said document identification code and the page number of said document.

2. The intelligent print system according to claim 1 wherein said priority generating unit is included in a printer driver of said document generating side.

3. The intelligent print system according to claim 1 wherein said priority generating unit is included in said machine side.

4. The intelligent print system according to claim 1 wherein said job selecting unit further selects said document having the highest priority to be printed if an interruption signal is asserted from said manual operation unit, and retrieves said document identification code and the page number of said document to be printed.

5. The intelligent print system according to claim 1 wherein said print control unit further retrieves a corresponding document file from said memory device according to said document identification code and the page number of said document.

6. The intelligent print system according to claim 1 wherein said job selecting unit retrieves said document identification code of said ready-for-print document according to the value listed in the column priority of said working status table.

7. The intelligent print system according to claim 1 wherein said manual operation unit is enabled when a valid password is entered, thereby limiting authority of the interruption function.

8. An intelligent print method, comprising steps of:
    (a) providing a priority generating function in a document generating side;

(b) receiving a document from said document generating side;
(c) receiving a document identification code from a working status table;
(d) opening said document in a document file of a single page format according to said document identification code and the page number of said document, and storing said document file into a memory device;
(e) retrieving said document identification code of said ready-for-print document according to the value listed in the priority column of said working status table;
(f) opening said document file according to said document identification code and the page number of said document to be printed; and
(g) transmitting said document file to an output buffer so as to be further printed;
wherein before step (d), said intelligent print method further comprises a step of discriminating whether a user's job intervenes by depressing an interrupt button of a manual operation unit on a machine side and inputting a user-setting document identification code through a user operation interface of said manual operation unit on said machine side, and a step of reading said document identification code from said user operation interface when said user's job intervenes.

9. The intelligent print method according to claim 8 wherein said priority generating function is automatically generated from said document generating side.

10. The intelligent print method according to claim 8 wherein said priority generating function is manually generated from said document generating side.

11. The intelligent print method according to claim 8 further comprising a step of showing the current working statuses when said interrupt button of said machine side is depressed.

12. An intelligent print method, comprising steps of:
(a) providing a machine priority table in a machine side;
(b) receiving a document from a document generating side;
(c) retrieving a document identification code from a working status table;
(d) opening said document in a document file of a single page format according to said document identification code and the page number of said document, and storing said document file into a memory device;
(e) retrieving said document identification code of said ready-for-print document according to the value listed in the column priority of said working status table;
(f) opening said document file according to said document identification code and the page number of said document to be printed; and
(g) transmitting said document file to an output buffer so as to be further printed;
wherein before step (d), said intelligent print method further comprises a step of discriminating whether a user's job intervenes by depressing an interrupt button of a manual operation unit on said machine side and inputting a user-setting document identification code through a user operation interface of said manual operation unit on said machine side, and a step of reading said document identification code from said user operation interface when said user's job intervenes.

13. The intelligent print method according to claim 12 further comprising a step of showing the current working statuses when said interrupt button of said machine side is depressed.

* * * * *

UNITED STATES PATENT AND TRADEMARK OFFICE
CERTIFICATE OF CORRECTION

PATENT NO. : 7,643,170 B2 Page 1 of 1
APPLICATION NO. : 11/201240
DATED : January 5, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Twenty-first Day of December, 2010

David J. Kappos
*Director of the United States Patent and Trademark Office*